(No Model.)

B. S. CROCKER.
LOCK NUT.

No. 281,180. Patented July 10, 1883.

Witnesses.
William A. Archer
Wm. H. Poor

Inventor.
Benjamin S. Crocker

N. PETERS. Photo-Lithographer. Washington, D. C.

UNITED STATES PATENT OFFICE.

BENJAMIN S. CROCKER, OF TOPEKA, KANSAS, ASSIGNOR OF ONE-HALF TO WM. HARRISON HILL, OF SAME PLACE.

LOCK-NUT.

SPECIFICATION forming part of Letters Patent No. 281,180, dated July 10, 1883.

Application filed February 9, 1883. (No model.)

*To all whom it may concern:*

Be it known that I, BENJAMIN S. CROCKER, a citizen of the United States, residing at Topeka, in the county of Shawnee and State of Kansas, have invented a new and useful Improvement in Lock-Nuts for Screws, of which the following is a specification.

The object of my invention is to provide an absolute lock-nut for screws. I attain this end by the contrivance shown in the following drawings, forming a part of this specification, in which—

Figure 2:
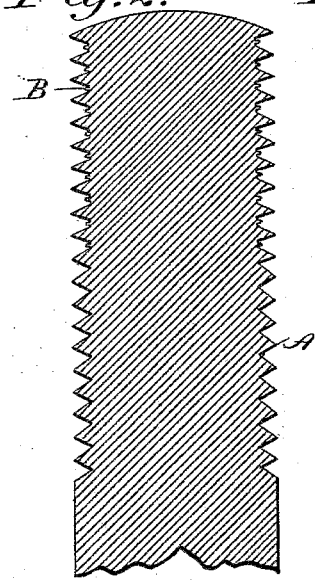
Figure 1:
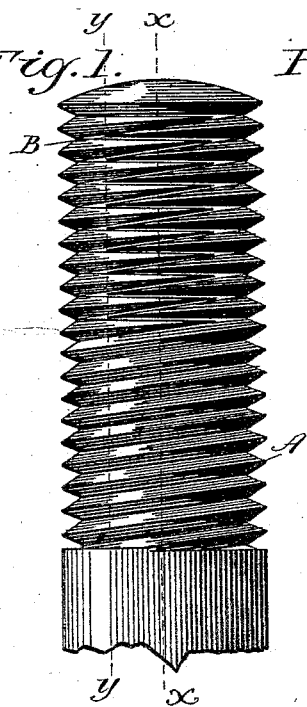
Figure 3:
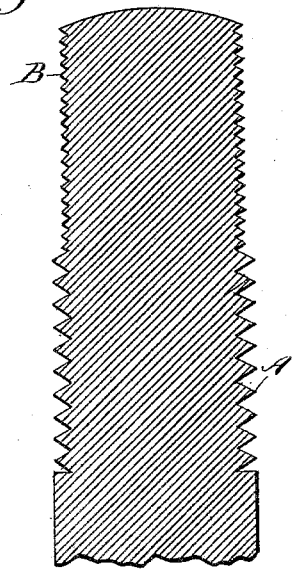
Figure 4:
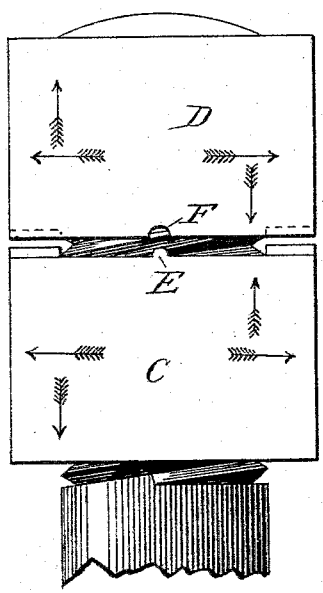
Figure 6:
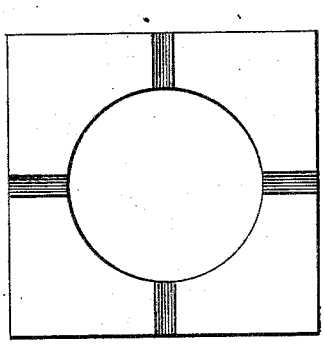
Figure 5:
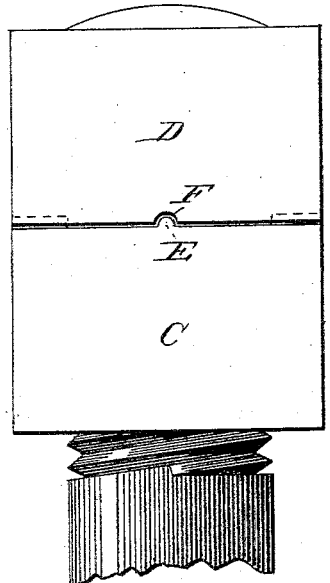

Figure 1 shows the end of a bolt with a right-and-left-hand screw cut upon the same portion of it. Figs. 2 and 3 show longitudinal sections of the same through the line of its diameter. Fig. 4 shows the two nuts employed upon the screw, just in position to be locked. Fig. 5 shows the nuts locked upon the screw. Fig. 6 shows an under side view of the lock-nut.

A is the thread of a right-hand screw, first cut upon the bolt, of any required diameter, having any desired pitch.

B is the thread of a left-hand screw, cut right upon the entire length of, or upon as much as is desired of, the right-hand screw.

C is a right-hand or support nut turned upon the right-hand thread, and D is a left-hand or locking nut turned upon the left-hand thread, of the screw. Now, when the right-hand nut is turned to its place and followed to a snug contact by the left-hand nut, any tendency of the right-hand or support nut to unscrew will equally tend to tighten the left-hand or lock nut, so that by the law of reciprocal antagonisms the nut C is positively and securely locked.

E represents a projection of any form, like which there may be two or more on the lock-nut-contact side of the support-nut. F represents a furrow or depression in the support-nut-contact side of the lock-nut, just fitted to receive the projections E. When the nuts are constructed in this form, the support-nut must be turned past the point at which it is ultimately to rest to just half the length of the projections E. The lock-nut is then turned almost to contact with the projections E of the support-nut, and so that these projections shall echo to their respective depressions F, at which position, if the nuts have been properly constructed, their wrench-surfaces will be in the same planes. Now, by turning both at once with the wrench, the support-nut will turn down to its resting-place, and the lock-nut will turn up to a snug contact with the support-nut, when, as in the former case, every tendency of the support-nut to unscrew will only force the lock-nut more snugly against it, and as by no means can any jolt or continuous jar now turn down the lock-nut, the support-nut is absolutely locked. It can only be unlocked now by turning both nuts backward at once with the wrench until the projections are lifted out of their respective depressions, when by turning down the lock-nut, as in the former case, the support-nut can be unscrewed.

The left-hand thread may be cut first, if desired, and the projections may be upon the lock-nut and the depressions upon the support-nut.

I claim and desire to secure by Letters Patent—

The combination of a bolt having intersecting right and left hand threads, A and B, with the nuts C D, having corresponding threads, one nut being provided with projections and the other with corresponding depressions on their meeting faces, as and for the purpose hereinbefore described.

BENJAMIN S. CROCKER.

Witnesses:
W. H. POOR,
WILLIAM A. ARCHER.